US012759906B2

(12) United States Patent
Wei et al.

(10) Patent No.: US 12,759,906 B2
(45) Date of Patent: Oct. 13, 2026

(54) BORON-DOPED DIAMOND ELECTRODE WITH ULTRA-HIGH SPECIFIC SURFACE AREA, AND PREPARATION METHOD THEREFOR AND APPLICATION THEREOF

(71) Applicant: NANJING ZUANXIN DIANHUAXUE TECHNOLOGY CO., LTD., Nanjing (CN)

(72) Inventors: Qiuping Wei, Changsha (CN); Li Ma, Changsha (CN); Kechao Zhou, Changsha (CN); Lifeng Wang, Changsha (CN); Baofeng Wang, Changsha (CN); Haiping Shi, Changsha (CN)

(73) Assignee: NANJING ZUANXIN DIANHUAXUE TECHNOLOGY CO., LTD., Nanjing (CN)

( * ) Notice: Subject to any disclaimer, the term of this patent is extended or adjusted under 35 U.S.C. 154(b) by 1007 days.

(21) Appl. No.: 17/924,682

(22) PCT Filed: May 10, 2021

(86) PCT No.: PCT/CN2021/092786
§ 371 (c)(1),
(2) Date: Nov. 11, 2022

(87) PCT Pub. No.: WO2021/228039
PCT Pub. Date: Nov. 18, 2021

(65) Prior Publication Data

US 2023/0183102 A1 Jun. 15, 2023

(30) Foreign Application Priority Data

May 11, 2020 (CN) ......................... 202010390578.8

(51) Int. Cl.
*C02F 1/461* (2023.01)
*C02F 1/467* (2023.01)
(Continued)

(52) U.S. Cl.
CPC ........ *C02F 1/46109* (2013.01); *C25B 11/059* (2021.01); *C25B 11/083* (2021.01);
(Continued)

(58) Field of Classification Search
CPC .... C25B 11/053; C25B 11/059; C25B 11/033
See application file for complete search history.

(56) References Cited

U.S. PATENT DOCUMENTS

| | | | | |
|---|---|---|---|---|
| 6,399,493 B1 * | 6/2002 | Dawson | ............. | H10D 64/0112 438/682 |
| 2010/0038235 A1 * | 2/2010 | Yoshida | .................. | C01B 32/26 204/290.03 |
| 2016/0362803 A1 * | 12/2016 | Zeng | ......................... | C25B 1/29 |

FOREIGN PATENT DOCUMENTS

| | | |
|---|---|---|
| CN | 1772947 A | 5/2006 |
| CN | 103370765 A | 10/2013 |

(Continued)

OTHER PUBLICATIONS

Wei Qiu-Ping, et al., Effect of acid etching of Si(100) and Si(111) on CVD diamond films, Journal of Central South University (Science and Technology), 2011, pp. 650-657, vol. 42, No. 3.

(Continued)

*Primary Examiner* — Ciel P Contreras
(74) *Attorney, Agent, or Firm* — Bayramoglu Law Offices LLC

(57) ABSTRACT

A boron-doped diamond electrode with an ultra-high specific surface area, and a preparation method therefor and the application thereof are provided. The boron-doped diamond electrode includes a substrate and an electrode working layer
(Continued)

arranged on a surface thereof, the substrate is polysilicon or monocrystal silicon with a high specific surface area, and the electrode working layer is a boron-doped diamond layer. The polysilicon with a high specific surface area is obtained by anisotropic etching and/or isotropic etching, and the monocrystal silicon with a high specific surface area is obtained by anisotropic etching. The boron-doped diamond layer includes a highly conductive layer, a corrosion-resistant layer, and a strongly electrocatalytically active layer, which have different boron contents. Compared with a traditional plate electrode, the present disclosure has a low cost and an extremely high specific surface area, provides a larger current intensity with a lower current density, and has broad application prospects.

13 Claims, 1 Drawing Sheet

(51) Int. Cl.
*C25B 11/059* (2021.01)
*C25B 11/083* (2021.01)

(52) U.S. Cl.
CPC .. *C02F 2001/46147* (2013.01); *C02F 1/4672* (2013.01); *C02F 2303/04* (2013.01)

(56) References Cited

FOREIGN PATENT DOCUMENTS

| | | | | | |
|---|---|---|---|---|---|
| CN | 106435518 | A | | 2/2017 | |
| CN | 106637111 | A | | 5/2017 | |
| CN | 110072658 | A | | 7/2019 | |
| CN | 111593316 | A | | 8/2020 | |
| EP | 1598443 | A2 | | 11/2005 | |
| WO | WO-2006013430 | A1 | * | 2/2006 | .......... C02F 1/46109 |

OTHER PUBLICATIONS

Liu Ting, et al., Morphology and electrochemical performance of high temperature etching boron doped diamond electrode materials, Materials Science and Engineering of Powder Metallurgy, 2019, pp. 164-170, vol. 25, No. 2.

* cited by examiner

BORON-DOPED DIAMOND ELECTRODE WITH ULTRA-HIGH SPECIFIC SURFACE AREA, AND PREPARATION METHOD THEREFOR AND APPLICATION THEREOF

CROSS REFERENCE TO THE RELATED APPLICATIONS

This application is the national phase entry of International Application No. PCT/CN2021/092786, filed on May 10, 2021, which is based upon and claims priority to Chinese Patent Application No. 202010390578.8, filed on May 11, 2020, the entire contents of which are incorporated herein by reference.

TECHNICAL FIELD

The present disclosure discloses a boron-doped diamond electrode with an ultra-high specific surface area, and a preparation method therefor and the application thereof, and belongs to the field of surface etching modification and vapor deposition technology.

BACKGROUND

Boron-doped diamond (BDD) film electrodes have high mechanical strength, chemical inertness and excellent electrochemical performance, e.g., wide potential window, high oxygen evolution overpotential and low background current in aqueous solution. BDD membrane electrodes may efficiently generate hydroxyl radicals under the same current density to quickly remove organics, have an anti-poisoning and antipollution surface, and thus may work stably in strongly corrosive media for a long time. No obvious sign of corrosion appears even under a high electrochemical load, after thousands of hours of electrochemical reaction at a current density of 2-10 $Acm^2$. The diamond film has high quality properties in hardness and strength, may withstand strong wave impact of the ultrasonic cavitation effect on an electrode surface, and shows a long service life in a high-strength environment. With progressive development of synthetic polycrystalline diamond film coating technology by chemical vapor deposition (CVD) and research in boron-doped P-type semiconductors, a CVD diamond film with the resistivity reduced to 0.01-100 cm becomes a favorable conductive electrode material. Research shows that the electrode will show broad application prospects in reduction of organic pollutants by electro oxidation and highly sensitive analysis and detection of organics.

However, the technology for degrading organic wastewater by BDD electrodes has not been widely accepted by the market, primarily because (I) a substrate of the existing BDD is mostly monocrystal silicon which is difficult to manufacture in a large volume; with the increase of the volume of monocrystal silicon, the manufacturing cost rises sharply, making the existing BDD electrode high in cost, low in cost performance, and difficult to completely meet the market requirements for economic efficiency; (II) the existing BDD planar electrode has small area, low surface roughness and low specific surface area, which makes the electrode have small active area, low space-time yield of strongly oxidizing group hydroxyl radical, low mass transfer rate and other shortcomings, restricting the electrocatalytic performance of the BDD electrode; and (III) compared with monocrystal silicon, a metal Ti substrate and a BDD electrode do not match well by thermal expansion and are easy to fall off, which makes it difficult to prepare large-area electrodes.

Compared with monocrystal silicon, a polysilicon substrate is cheap and easy to realize large-scale industrial manufacturing. However, the conductivity of a polysilicon substrate is poor, and which makes a BDD electrode have low current efficiency and high degradation energy consumption. Therefore, there are many deficiencies in the application of polysilicon to BDD electrodes.

SUMMARY

The objective of the present disclosure is to overcome the deficiencies of the prior art, and provide a boron-doped diamond electrode with an ultra-high specific surface area, a preparation method therefor suitable for large-area preparation with simple process and low cost, and the application thereof.

To achieve the foregoing objective, the present disclosure adopts the following technical solutions.

The present disclosure provides a boron-doped diamond electrode with an ultra-high specific surface area. The boron-doped diamond electrode includes a substrate and an electrode working layer, where a surface of the substrate is covered by the electrode working layer, the substrate is polysilicon or monocrystal silicon with a high specific surface area, and the electrode working layer is a boron-doped diamond layer. The polysilicon with a high specific surface area is obtained by carrying out anisotropic etching and/or isotropic etching on a surface of polysilicon, and the monocrystal silicon with a high specific surface area is obtained by carrying out anisotropic etching on a surface of monocrystal silicon.

In the present disclosure, the electrode with a high specific surface area is obtained by etching the surface of a polysilicon substrate, and the surface roughness of the electrode is greatly improved.

The polysilicon surface subjected to anisotropic etching presents one of a step-like shape, a gully shape, a dot shape and a column shape in macro morphology; and the monocrystal silicon surface subjected to anisotropic etching presents one of a step-like shape, a gully shape and a dot shape. The polysilicon surface subjected to isotropic etching contains pits and/or micro holes; and a two-stage high specific surface area structure containing a large number of micro holes formed by anisotropic etching is formed on the polysilicon surface subjected to anisotropic etching and isotropic etching in macro morphology.

In the boron-doped diamond electrode with an ultra-high specific surface area provided by the present disclosure, preferably, the substrate is polysilicon with a high specific surface area. Compared with monocrystal silicon, polysilicon has a huge cost advantage, and the specific surface area of the polysilicon etched is greatly increased in the present disclosure.

In the boron-doped diamond electrode with an ultra-high specific surface area provided by the present disclosure, preferably, the polysilicon with a high specific surface area is obtained by carrying out isotropic etching on a polysilicon surface.

The inventor found that a BDD electrode prepared with the polysilicon with a high specific surface area, which is obtained by carrying out isotropic etching on the polysilicon surface, as the substrate has the best electrochemical performance and favorable electrode reversibility.

In the boron-doped diamond electrode with an ultra-high specific surface area provided by the present disclosure, preferably, the polysilicon with a high specific surface area is obtained by carrying out anisotropic etching and isotropic etching on the polysilicon surface.

In the boron-doped diamond electrode with an ultra-high specific surface area provided by the present disclosure, the substrate is in a shape of a column, a cylinder or a flat plate; and the substrate is a three-dimensional continuous network structure, a two-dimensional continuous network structure or a two-dimensional closed flat plate structure.

In the boron-doped diamond electrode with an ultra-high specific surface area provided by the present disclosure, the boron-doped diamond layer includes a boron-doped diamond highly conductive layer, a boron-doped diamond corrosion-resistant layer, and a boron-doped diamond strongly electrocatalytically active layer, which have different boron contents and are successively deposited on the substrate surface, preferably, it is uniformly deposited on the substrate surface sequentially by chemical vapor deposition.

In the boron-doped diamond electrode with an ultra-high specific surface area provided by the present disclosure, in the boron-doped diamond highly conductive layer, B/C is 20000-33333 ppm in atomic ratio.

First, a boron-doped diamond conductive layer with a high boron content is deposited on the substrate surface, and through a high boron doping content, high conductivity similar to a metallic state is obtained.

In the boron-doped diamond electrode with an ultra-high specific surface area provided by the present disclosure, in the boron-doped diamond corrosion-resistant layer, B/C is 0-10000 ppm in atomic ratio, preferably 3333-10000 ppm. As the intermediate layer, the boron-doped diamond corrosion-resistant layer retains a high purity of diamond by means of a low boron doping content. Due to the high purity of diamond, diamond grains are compact and uniform and have few defects, and corrosive substances cannot corrode the silicon substrate through the corrosion-resistant layer during the electrochemical degradation process, so the corrosion resistance of BDD is greatly improved and the service life is prolonged.

In the boron-doped diamond electrode with an ultra-high specific surface area provided by the present disclosure, in the boron-doped diamond strongly electrocatalytically active layer, B/C is 10000-20000 ppm in atomic ratio. The boron-doped diamond strongly electrocatalytically active layer as the top layer deposited on the surface of the boron-doped diamond corrosion-resistant layer has an increased boron-doping content. Due to the increase of the boron doping content, the boron-doped diamond strongly electrocatalytically active layer has more defects, and the utilization of hydroxyl radicals increases. Therefore, the boron-doped diamond strongly electrocatalytically active layer has the characteristics of wide potential window, high oxygen evolution potential and low background current, where the oxygen evolution potential is greater than or equal to 2.3 V, and the potential window is greater than or equal to 3.0 V.

In the boron-doped diamond electrode with an ultra-high specific surface area provided by the present disclosure, the boron-doped diamond layer has a thickness of 5 μm-2 mm, and the boron-doped diamond strongly electrocatalytically active layer accounts for 40-60% of the boron-doped diamond layer in thickness. In the present disclosure, a guarantee of the thickness of the boron-doped diamond strongly electrocatalytically active layer may make the electrode material have excellent electrocatalytic activity, and improve the efficiency of degrading wastewater.

In the boron-doped diamond electrode with an ultra-high specific surface area provided by the present disclosure, micro holes and/or sharp cones are distributed on the surface of the boron-doped diamond layer.

The present disclosure provides a preparation method for the boron-doped diamond electrode with a high specific surface area, including the following steps:

Step I: Pretreatment of Substrate carrying out anisotropic etching or/and isotropic etching on the surface of a polysilicon substrate material to obtain polysilicon with a high specific surface area; and carrying out isotropic etching on the surface of a monocrystal silicon substrate material to obtain monocrystal silicon with a high specific surface area.

Step II: Planting of Seed Crystals on Substrate Surface placing the polysilicon with a high specific surface area or the monocrystal silicon with a high specific surface area obtained in step I in a suspension containing mixed particles of nanocrystal and/or microcrystal diamond, and carrying out ultrasonic treatment and drying to obtain polysilicon with a high specific surface area or monocrystal silicon with a high specific surface area with the nanocrystal and/or microcrystal diamond adsorbed on the surface.

Step III: Deposition of Boron-Doped Diamond Layer placing the polysilicon with a high specific surface area or the monocrystal silicon with a high specific surface area obtained in step II in a chemical vapor deposition furnace, injecting carbon containing gas and boron containing gas, and sequentially carrying out three stages of deposition to obtain the boron-doped diamond layer, where during the first stage of deposition, the boron containing gas is controlled to account for 0.03%-0.05% of the total mass flow of gas in the furnace; during the second stage of deposition, the boron containing gas is controlled to account for 0%-0.015% of the total mass flow of gas in the furnace, and during the third stage of deposition, the boron containing gas is controlled to account for 0.015%-0.03% of the total mass flow of gas in the furnace.

Step IV: High-Temperature Treatment carrying out heat treatment on the polysilicon with a high specific surface area or the monocrystal silicon with a high specific surface area with the boron-doped diamond layer deposited, where the heat treatment temperature is 400-1200° C., the treatment time is 5-110 min, the pressure in the furnace is 10-$10^5$ Pa, and the heat treatment atmosphere contains an etching gas.

In the preparation method for the boron-doped diamond electrode with a high specific surface area provided by the present disclosure, in step I, the specific process of carrying out anisotropic etching on the surface of a polysilicon substrate material is: soaking the polysilicon substrate material in an anisotropic etching solution at 20-90° C. for 10-180 min, and cleaning and drying the polysilicon substrate material.

Preferably, the anisotropic etching solution is one of: sodium hydroxide solution, potassium hydroxide solution, mixed solution of sodium hydroxide and sodium hypochlorite, tetramethyl ammonium hydroxide solution (TMAH), mixed solution of tetramethyl ammonium hydroxide and isopropanol (TMAH+IPA), mixed solution of tetramethyl ammonium hydroxide and polyethylene glycol octyl phenyl ether (TMAH+Tritonx-100), mixed solution of tetramethyl ammonium hydroxide and ammonium persulfate (TMAH+APS), mixed solutions of tetramethylammonium hydroxide, polyethylene glycol octyl phenyl ether and isopropanol (TMAH+Tritonx-100+IPA), mixed solution of ethylenediamine, pyrocatechol and water (EPW), and ethylenediamine phosphoquinone (EDP).

In the preparation method for the boron-doped diamond electrode with a high specific surface area provided by the present disclosure, in step I, the specific process of carrying out isotropic etching on the surface of a polysilicon substrate material is: soaking the polysilicon substrate material in an isotropic etching solution at 0-90° C. for 10 s-130 min, and cleaning and drying the polysilicon substrate material.

Preferably, the isotropic etching solution is one of mixed solution of hydrofluoric acid and nitric acid, mixed solution of hydrofluoric acid, nitric acid and acetic acid, and mixed solution of hydrofluoric acid and acetic acid.

Further preferably, the isotropic etching solution is the mixed solution of hydrofluoric acid and nitric acid, the volume ratio of which is: hydrofluoric acid; nitric acid=(1-6):1; preferably (2-4):1.

In the preparation method for the boron-doped diamond electrode with a high specific surface area provided by the present disclosure, in step II, the mass fraction of diamond mixed particles in the suspension containing nanocrystal and/or microcrystal diamond mixed particles is 0.01%-0.05%.

In the preparation method for the boron-doped diamond electrode with a high specific surface area provided by the present disclosure, in step II, the ultrasonic treatment time is 5-30 min. After the ultrasonic treatment, the substrate is taken out, washed with deionized water and/or absolute ethanol, and dried.

In the preparation method for the boron-doped diamond electrode with a high specific surface area provided by the present disclosure, the carbon containing gas accounts for 0.5-10.0% of the total mass flow of gas in the furnace during the three stages of deposition, preferably 1-5%.

In the present disclosure, one of solid, gas and liquid boron sources may be used as the boron source. When the solid and liquid boron sources are used, gasification treatment is carried out first.

In the preparation method for the boron-doped diamond electrode with a high specific surface area provided by the present disclosure, the carbon containing gas is $CH_4$; and the boron containing gas is $B_2H_6$.

In the preparation method for the boron-doped diamond electrode with a high specific surface area provided by the present disclosure, in step III, the first stage of deposition is carried out at 600-1000° C. and $10^3$-$10^4$ Pa for less than or equal to 18 h; the second stage of deposition is carried out at 600-1000° C. and $10^3$-$10^4$ Pa for less than or equal to 18 h; and the third stage of deposition is carried out at 600-1000° C. and $10^3$-$10^4$ Pa for less than or equal to 18 h.

In the preparation method for the boron-doped diamond electrode with a high specific surface area provided by the present disclosure, in step III, the first stage of deposition is carried out with the incoming gases hydrogen, carbon containing gas and boron containing gas in a flow rate ratio of 97 sccm:3 ccm:0.6-1.0 sccm; the second stage of deposition is carried out with the incoming gases hydrogen, carbon containing gas and boron containing gas in a flow rate ratio of 97 sccm:3 ccm:0.2-0.5 sccm; and the third stage of deposition is carried out with the incoming gases hydrogen, carbon containing gas and boron containing gas in a flow rate ratio of 97 sccm:3 scccm:0.3-0.6 ccm.

In the preparation method for the boron-doped diamond electrode with a high specific surface area provided by the present disclosure, in step IV, the heat treatment temperature is 600-800° C., and the treatment time is 10-30 min.

The present disclosure provides the application of the boron-doped diamond electrode with a high specific surface area, specifically, the boron-doped diamond electrode is used in electrochemical oxidation treatment of wastewater, sterilization and disinfection of various daily water, removal of organic pollutants, or ozone generators, or electrochemical biosensors.

In the use of the boron-doped diamond electrode with a high specific surface area provided by the present disclosure, the boron-doped diamond electrode is used in electrochemical synthesis or electrochemical detection.

In the present disclosure, the low cost polysilicon is used as the substrate, and by means of the advantage of anisotropy of polysilicon substrate grains, a two-stage high specific surface area structure with "large pits and micro pits" is etched using an orientation sensitive reagent. The polysilicon with excellent performance is used as the substrate, and a high specific surface area structure with a "textured surface" is etched using the orientation sensitive reagent. Multilayer structure BDD films are prepared by adjusting the boron-doping concentration to make the BDD films have corrosion resistance, high conductivity and high activity. Finally, uniformly distributed holes and sharp cones are catalytically etched on the bumpy surface of the boron-doped diamond film by thermal catalytic etching technology, further increasing the specific surface area of the boron-doped diamond film, and thereby obtaining a boron-doped diamond electrode with an ultra-high specific surface area of a three-stage porous structure with "large pits, small pits and holes/sharp cones".

In the present disclosure, the hole concentration in the BDD films is increased by boron doping to form R-type diamond films. The content of sp2 graphite phase is suppressed by adjusting the doping process parameters and boron concentration, and diamond films with complete diamond grains, large size, high current efficiency, low energy consumption, good corrosion resistance and good degradation effect are obtained.

Moreover, the electrode with a high specific surface area obtained by surface etching greatly improves the surface roughness of the electrode, increases the contact area between wastewater and the electrode, increases active reaction sites on the electrode surface during the electrocatalytic process, and generates more strongly oxidizing hydroxyl radicals to attack the molecules of organic compounds and damage and degrade the organic compounds, thereby greatly improving the efficiency of BDD electrodes in degrading wastewater, and reducing energy consumption and operating costs.

Advantages of the Present Disclosure Compared with Other Technologies

To solve the problems of traditional flat two-dimensional electrodes of small active area, small treatment capacity per unit tank, low current efficiency, high energy consumption, low cost performance, etc., the present disclosure improves the active area of BDD in various aspects, while reducing the manufacturing and operating costs of BDD electrodes, specifically as shown below:

(1) The present disclosure uses polysilicon as the electrode substrate. Compared with a monocrystal silicon substrate, the production process is simple, has low cost, can provide a large substrate area, is suitable for large-area preparation and can meet the requirements of industrial scale manufacturing.

(2) As polysilicon consists of grains with different orientations, the anisotropy of crystals may be effectively used for etching the surface using orientation sensitive alkaline corrosive reagents to form a bumpy rough surface with large ups and downs, and then making micro pits on the bumpy surface using orientation insensitive acid corrosive reagents to form a two-stage high specific surface structure with "large pits and micro pits". Then, the substrate surface replication effect of CVD technology is used, a diamond film with the composite surface morphology of "big pits and micro pits" is deposited on the existing polysilicon substrate surface, and a boron-doped electrode with a high specific surface area is obtained.

(3) The rough polysilicon substrate after etching not only increases the specific surface area of the diamond film, but also improves the binding force between the film and the substrate due to the mechanical bond therebetween.

(4) On this basis, uniformly distributed holes and sharp cones are catalytically etched on the bumpy surface of the boron-doped diamond film by thermal catalytic etching technology, further increasing the specific surface area of the boron-doped diamond film, and thereby obtaining a boron-doped diamond electrode with an ultra-high specific surface area of a three-stage porous structure with "large pits, small pits and holes/sharp cones".

(5) The ultra-high specific surface area greatly increases the space-time yield of strongly oxidizing hydroxyl radicals on the electrode surface, greatly speeds up mass transfer, and makes the electrode have a high apparent current density, thereby greatly improving the space utilization and degradation efficiency of BDD electrodes.

(6) In addition, a layer of BDD film with a high boron content is deposited on the surface of a polysilicon substrate by adjusting the boron-doping process parameters first to obtain a heavily boron-doped diamond layer similar to the metallic state, which greatly improves the conductivity and current efficiency of the silicon substrate BDD electrodes, and greatly reduces the energy consumption for degradation. Then, a high-quality diamond layer with long life and corrosion resistance is deposited on the surface of the highly conductive boron-doped diamond layer by adjusting the boron-doping process parameters. The diamond layer may greatly improve the applicable environment and service life of the electrode, and operate for a long time in any strong acidic, strong alkaline and high saline environment. Finally, a strongly electrocatalytic active boron-doped diamond layer with wide potential window, high oxygen evolution potential and low background current is deposited on the surface of the corrosion resistant boron-doped diamond layer by adjusting the boron-doping process parameters, and the resulting diamond layer may greatly improve the electrocatalytic activity and degradation efficiency of the electrode.

In summary, the BDD electrode of the present disclosure has the advantages of low manufacturing cost, high cost performance, favorable conductivity, high current efficiency, low degradation energy consumption, large electrocatalytic active area, high space-time yield of strongly oxidizing groups (hydroxyl radicals), high mass transfer rate, etc. Moreover, boron-doped diamond and polysilicon match well by thermal expansion, have long service life in harsh environments such as strong acids and strong alkalis, have low cost for large-area preparation, and effectively improve the cost performance of BDD. The present disclosure is economical, environmentally-friendly, simple in operation, low in energy consumption, high in degradation efficiency and small in floor area, can be popularized in large-scale projects and meet the market requirements for economic efficiency, and has favorable application prospects.

DETAILED DESCRIPTION OF THE EMBODIMENTS

Example 1

Figure 1:
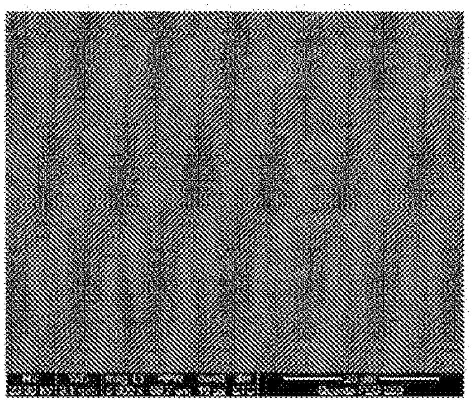
FIG. 1 shows the morphology of a polysilicon substrate subjected to anisotropic etching in Example 1.

First, anisotropic etching was carried out on the surface of a polysilicon substrate material. The polysilicon substrate material was soaked in a 10 M KOH solution as the anisotropic etching solution at 80° C. for 60 min, and then cleaned and dried to obtain step-like polysilicon with a high specific surface area, the shape of which is shown in FIG. 1.

The etched polysilicon was placed in a suspension of nanocrystal and microcrystal diamond mixed particles, and subjected to ultrasonic vibration for 30 min to obtain the polysilicon substrate with diamond grains adsorbed on the surface.

The substrate was put into a chemical vapor deposition furnace. The distance between a hot wire and the substrate surface was kept at 9 mm. A hydrogen gas flow rate was adjusted and kept at 97 sccm during the heating process, and methane and borane were injected into the furnace to start deposition at a temperature of 850° C. and a pressure of 3 kPa in a mixed atmosphere of $B_2H_4$, $CH_4$ and $H_2$. When a highly conductive layer was deposited, the gas ratio was $B_2H_6$:$CH_4$:$H_2$=1.0 sccm:3.0 sccm:97 sccm, and the deposition time was 3 h; when a corrosion resistant layer was deposited, the gas ratio was $B_2H_6$:$CH_4$:$H_2$=0.2 sccm:3.0 sccm:97 sccm, and the deposition time was 3 h; and when a strongly electrocatalytically active layer was deposited, the gas ratio was $B_2H_6$:$CH_4$:$H_2$=0.6 sccm:3.0 sccm:97 sccm, and the deposition time was 6 h.

The resulting electrode material was put into a tubular furnace, and subjected to heat treatment in the air. The temperature was set and kept at 750° C. for 20 min. After high temperature oxidation, the electrode surface appeared some tapered shape.

The electrode was assembled and its performance was tested with a three electrode system. The results showed that the oxygen evolution potential was 1.82 V, the hydrogen evolution potential was −0.60 V, the potential window was 2.42 V, and the background current was 83.42 $\mu A/cm^2$.

It can be seen from the above data that the polysilicon substrate subjected to anisotropic etching has excellent electrochemical performance and favorable electrode reversibility.

Example 2

Figure 2:
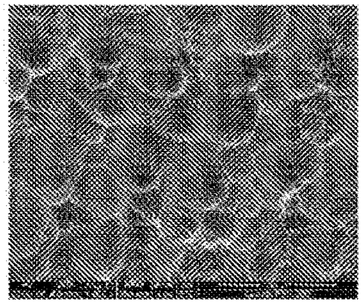
FIG. 2 shows the morphology of a polysilicon substrate subjected to isotropic etching in Example 2.

Except that a polysilicon substrate was subjected to isotropic etching in Example 2, other conditions were the same as in Example 1. First, isotropic etching was carried out on the surface of a polysilicon substrate material in an analytical pure HF and $HNO_3$ mixed solution in a volume ratio of $HF:HNO_3=3:1$ as an isotropic etching solution. The polysilicon substrate material was soaked in the isotropic etching solution for 2 min at room temperature for etching, and then cleaned and dried to obtain pits and micro holes composited polysilicon with a high specific surface area, the shape of which is shown in FIG. 2.

The subsequent preparation process was the same as that of Example 1. The electrode performance was tested, and the results showed that the oxygen evolution potential was 2.37 V, the hydrogen evolution potential was −0.55 V, the potential window was 2.92 V, and the background current was 39.71 $\mu A/cm^2$.

It can be seen from the above data that the polysilicon substrate subjected to isotropic etching has excellent electrochemical performance and favorable electrode reversibility. When the electrode was used for degrading reactive blue 19 for 3 h, the decolority removal rate was 100%, the TOC removal rate was 55%, and the energy consumption was 36 kW-h.

In addition, in this example, the effect of the mixed solutions of HF and $HNO_3$ in different ratios (1:1, 2:1, 6:1) on the isotropic etching of the polysilicon substrate material was also investigated. The etching time was 2 min, and microstructure characterization found that:

the film surfaces prepared by all the mixed etching solutions were completely covered with diamond, the content of graphite phase was very small, and the diamond growth was well. The film diamond obtained with an etching solution in a mixing ratio of 1:1 has an uneven grain size and fewer pits. The film obtained with an etching solution in a mixing ratio of 6:1 has fewer pits and many deep holes with a smaller diameter. The BDD film obtained with an etching solution in a mixing ratio of 3:1 has the largest specific surface area.

The electrode was assembled and its performance was tested with a three electrode system. The results showed that when the etching solution was in a mixing ratio of HF:HNO3=1:1, the oxygen evolution potential was 2.20 V, the hydrogen evolution potential was −0.51 V, the potential window was 2.71 V, and the background current was 124.50 $\mu A/cm^2$; when the etching solution was in a mixing ratio of $HF:HNO_3=2:1$, the oxygen evolution potential was 2.31 V, the hydrogen evolution potential was −0.53 V, the potential window was 2.84 V, and the background current was 33.43 $\mu A/cm^2$; when the etching solution was in a mixing ratio of $HF:HNO_3=3:1$, the oxygen evolution potential was 2.37 V, the hydrogen evolution potential was −0.55 V, the potential window was 2.92 V, and the background current was 39.71 $\mu A/cm^2$; and when the etching solution was in a mixing ratio of $HF:HNO_3=6:1$, the oxygen evolution potential was 2.22 V, the hydrogen evolution potential was −0.54 V, the potential window was 2.76 V, and the background current was 133.26 $\mu A/cm^2$. It can be seen from the above data that the BDD electrodes prepared with the four mixed etching solutions all have excellent electrochemical performance, where the electrode obtained with the etching solution in a mixing ratio of 3:1 has the highest oxygen evolution potential and the widest potential window, and has the best electrochemical performance in general.

Example 3

Figure 3:
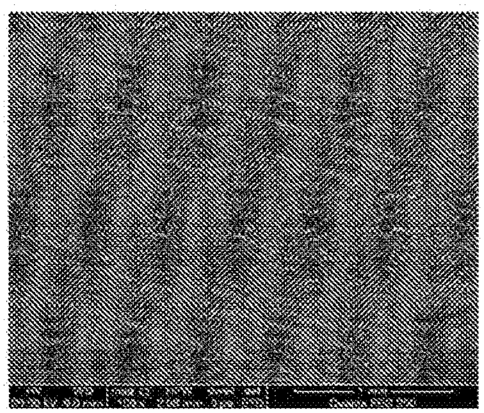
FIG. 3 shows the morphology of a polysilicon substrate subjected to anisotropic etching first and then isotropic etching in Example 3.

In Example 3, a step-like polysilicon substrate was first etched by anisotropic etching, and then subjected to isotropic etching. The etching parameters of the etching solution were the same as those in Examples 1 and 2. The morphology of the resulting polysilicon substrate is shown in FIG. 3.

Then, a BDD electrode was prepared by the same method as in Example 1, and the electrode performance was tested. The results showed that the oxygen evolution potential was 2.52 V, the hydrogen evolution potential was −0.63 V, the potential window was 3.15 V, and the background current was 12.62 $\mu A/cm^2$.

It can be seen from the above data that the polysilicon substrate subjected to anisotropic etching combined with isotropic etching has excellent electrochemical performance and favorable electrode reversibility.

Figure 4:
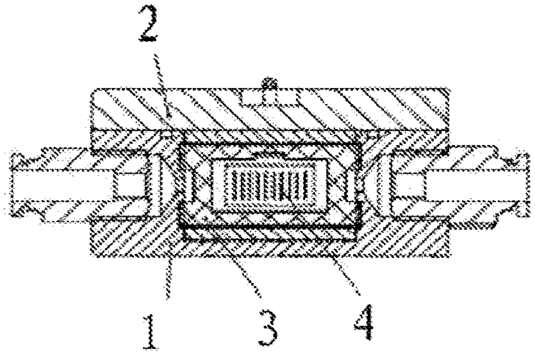
FIG. 4 is the structure of an ozone generator in Example 3, wherein: 1. Shell, 2. Gland, 3. Electrode holder, and 4. Electrode assembly.

The BDD electrode prepared in Example 3 was applied to an ozone generator, the structure of which is shown in FIG. 4, including a shell 1, a gland 2, an electrode holder 3, and an electrode assembly 4.

The BDD electrode prepared in Example 3 was used as an anode, and a titanium mesh was used as a cathode, the electrode assembly was formed with a perfluorinated ion membrane and installed in the ozone generator (FIG. 4). A constant current power supply was applied for trial operation, and the gas production performance of the ozone generator was tested. The results showed that the average ozone yield was 967 mg/h.

Comparative Example 1

Except that the first stage deposition was not carried out in Comparative Example 1, other conditions were the same as in Example 1. The electrode performance was tested, and the results showed that the oxygen evolution potential was 1.79 V, the hydrogen evolution potential was −0.58 V, the potential window was 2.37 V, and the background current was 292.71 $\mu A/cm^2$.

It can be seen that the electrode performance is obviously inferior to Example 1. The electrode has high resistance, which will increase the energy consumption greatly in the actual wastewater degradation process.

What is claimed is:

1. A boron-doped diamond electrode, comprising a substrate and an electrode working layer, wherein a surface of the substrate is covered by the electrode working layer; the substrate is a polysilicon or a monocrystal silicon; the electrode working layer is a boron-doped diamond layer; the polysilicon is obtained by carrying out an anisotropic etching and/or an isotropic etching on a surface of the polysilicon; and the monocrystal silicon is obtained by carrying out the anisotropic etching on a surface of the monocrystal silicon;

wherein the boron-doped diamond layer comprises a boron-doped diamond conductive layer, a boron-doped diamond corrosion-resistant layer, and a boron-doped diamond electrocatalytically active layer, and the boron-doped diamond conductive layer, the boron-doped diamond corrosion-resistant layer, and the boron-doped diamond electrocatalytically active layer have different boron contents and are successively deposited on the surface of the substrate;

wherein in the boron-doped diamond conductive layer, a B/C is 20000 ppm-33333 ppm in an atomic ratio; in the boron-doped diamond corrosion-resistant layer, a B/C is 0 ppm-10000 ppm in the atomic ratio; and in the boron-doped diamond electrocatalytically active layer, a B/C is 10000 ppm-20000 ppm in the atomic ratio.

2. The boron-doped diamond electrode according to claim 1, wherein the substrate is the polysilicon; the polysilicon is obtained by carrying out the isotropic etching on the surface of the polysilicon;

the substrate is in a shape of a column, a cylinder, or a flat plate; and the substrate is a three-dimensional continuous network structure, a two-dimensional continuous network structure, or a two-dimensional closed flat plate structure.

3. The boron-doped diamond electrode according to claim 2, wherein the boron-doped diamond layer has a thickness of 5 μm-2 mm; the boron-doped diamond electrocatalytically active layer accounts for 40%-60% of the boron-doped diamond layer in the thickness; and micro holes and/or sharp cones are distributed on a surface of the boron-doped diamond layer.

4. The boron-doped diamond electrode according to claim 1, wherein the boron-doped diamond layer has a thickness of 5 μm-2 mm; the boron-doped diamond electrocatalytically active layer accounts for 40%-60% of the boron-doped diamond layer in the thickness; and micro holes and/or sharp cones are distributed on a surface of the boron-doped diamond layer.

5. A boron-doped diamond electrode, comprising a substrate and an electrode working layer, wherein a surface of the substrate is covered by the electrode working layer; the substrate is a polysilicon or a monocrystal silicon; the electrode working layer is a boron-doped diamond layer; the polysilicon is obtained by carrying out an anisotropic etching and/or an isotropic etching on a surface of the polysilicon; and the monocrystal silicon is obtained by carrying out the anisotropic etching on a surface of the monocrystal silicon;

wherein the boron-doped diamond layer comprises a boron-doped diamond conductive layer, a boron-doped diamond corrosion-resistant layer, and a boron-doped diamond electrocatalytically active layer, and the boron-doped diamond conductive layer, the boron-doped diamond corrosion-resistant layer, and the boron-doped diamond electrocatalytically active layer have different boron contents and are successively deposited on the surface of the substrate;

wherein the boron-doped diamond layer has a thickness of 5 μm-2 mm; the boron-doped diamond electrocatalytically active layer accounts for 40%-60% of the boron-doped diamond layer in the thickness; and micro holes and/or sharp cones are distributed on a surface of the boron-doped diamond layer.

6. The boron-doped diamond electrode with according to claim 5, wherein the substrate is the polysilicon; the polysilicon is obtained by carrying out the isotropic etching on the surface of the polysilicon;

the substrate is in a shape of a column, a cylinder, or a flat plate; and the substrate is a three-dimensional continuous network structure, a two-dimensional continuous network structure, or a two-dimensional closed flat plate structure.

7. A method for preparing the boron-doped diamond electrode according to claim 1, comprising the following steps:

step I: pretreating the substrate carrying out the anisotropic etching or/and the isotropic etching on a surface of a polysilicon substrate material to obtain the polysilicon; and carrying out the anisotropic etching on a surface of a monocrystal silicon substrate material to obtain the monocrystal silicon;

step II: planting seed crystals on the surface of the substrate placing the polysilicon or the monocrystal silicon obtained in the step I in a suspension containing mixed particles of a nanocrystal diamond and/or a microcrystal diamond, and carrying out an ultrasonic treatment and a drying to obtain the polysilicon or the monocrystal silicon with the nanocrystal diamond and/or the microcrystal diamond adsorbed on the surface of the polysilicon and the surface of the monocrystal silicon;

step III: depositing the boron-doped diamond layer placing the polysilicon or the monocrystal silicon obtained in the step II in a chemical vapor deposition furnace, injecting a carbon containing gas and a boron containing gas, and sequentially carrying out three stages of a deposition to obtain the boron-doped diamond layer, wherein during a first stage of the deposition, the boron containing gas is controlled to account for 0.03%-0.05% of a total mass flow of a gas in the chemical vapor deposition furnace; during a second stage of the deposition, the boron containing gas is controlled to account for 0%-0.015% of the total mass flow of the gas in the chemical vapor deposition furnace, and during a third stage of the deposition, the boron containing gas is controlled to account for 0.015%-0.03% of the total mass flow of the gas in the chemical vapor deposition furnace; and step IV: a high-temperature treatment carrying out a heat treatment on the polysilicon or the monocrystal silicon with the boron-doped diamond layer deposited, wherein a temperature of the heat treatment is 400° C.-1200° C., a time of the heat treatment is 5 min-110 min, a pressure in the chemical vapor deposition furnace is 10 Pa-$10^5$ Pa, and an atmosphere of the heat treatment contains an etching gas.

8. The method for preparing the boron-doped diamond electrode according to claim 7, wherein in the step I, a specific process of carrying out the anisotropic etching on the surface of the polysilicon substrate material is: soaking the polysilicon substrate material in an anisotropic etching solution at 20° C.-90° C. for 10 min-180 min, and cleaning and drying the polysilicon substrate material; and the anisotropic etching solution is one of: a sodium hydroxide solution, a potassium hydroxide solution, a mixed solution of sodium hydroxide and sodium hypochlorite, a tetramethyl ammonium hydroxide solution, a mixed solution of tetramethyl ammonium hydroxide and isopropanol, a mixed solution of the tetramethyl ammonium hydroxide and polyethylene glycol octyl phenyl ether, a mixed solution of the tetramethyl ammonium hydroxide and ammonium persulfate, a mixed solution of the tetramethyl ammonium hydroxide, the polyethylene glycol octyl phenyl ether, and the isopropanol, a mixed solution of ethylenediamine, pyrocatechol, and water, and ethylenediamine phosphoquinone.

9. The method for preparing the boron-doped diamond electrode according to claim 7, wherein in the step I, a specific process of carrying out the isotropic etching on the surface of the polysilicon substrate material is: soaking the polysilicon substrate material in an isotropic etching solution at 0° C.-90° C. for 10 s-130 min, and cleaning and drying the polysilicon substrate material; and the isotropic etching solution is one of a mixed solution of hydrofluoric acid and nitric acid, a mixed solution of the hydrofluoric acid, the nitric acid, and acetic acid, and a mixed solution of the hydrofluoric acid and the acetic acid.

10. The method for preparing the boron-doped diamond electrode according to claim 7, wherein in the step II, a mass fraction of the mixed particles in the suspension containing the mixed particles of the nanocrystal diamond and/or the microcrystal diamond is 0.01%-0.05%; in the step II, a time of the ultrasonic treatment is 5 min-30 min;

in the step III, the carbon containing gas accounts for 0.5%-10.0% of the total mass flow of the gas in the chemical vapor deposition furnace during the three stages of the deposition; and in the step III, the first stage of the deposition is carried out at 600° C.-1000° C. and $10^3$ Pa-$10^4$ Pa for less than or equal to 18 h; the second stage of the deposition is carried out at 600° C.-1000° C. and $10^3$ Pa-$10^4$ Pa for less than or equal to 18 h; and the third stage of the deposition is carried out at 600° C.-1000° C. and $10^3$ Pa-$10^4$ Pa for less than or equal to 18 h.

11. The method for preparing the boron-doped diamond electrode according to claim 7, wherein the substrate is the polysilicon; the polysilicon is obtained by carrying out the isotropic etching on the surface of the polysilicon;

the substrate is in a shape of a column, a cylinder, or a flat plate; and the substrate is a three-dimensional continuous network structure, a two-dimensional continuous network structure, or a two-dimensional closed flat plate structure.

12. The method for preparing the boron-doped diamond electrode according to claim 7, wherein the boron-doped diamond layer has a thickness of 5 μm-2 mm; the boron-doped diamond electrocatalytically active layer accounts for 40%-60% of the boron-doped diamond layer in the thickness; and micro holes and/or sharp cones are distributed on a surface of the boron-doped diamond layer.

13. A method of a use of the boron-doped diamond electrode according to claim 1, wherein the boron-doped diamond electrode is used in an electrochemical oxidation treatment of a wastewater, a sterilization and a disinfection of a various daily water, a removal of organic pollutants, or ozone generators, or electrochemical biosensors.

* * * * *